「(12) United States Patent
Barker et al.

(10) Patent No.: US 8,323,609 B2
(45) Date of Patent: Dec. 4, 2012

(54) CARBON NANOSTRUCTURE SYNTHESIS FROM CARBON-EXCESS EXPLOSIVES IN SUPERCRITICAL FLUID

(75) Inventors: Delmar L. Barker, Tucson, AZ (US); Mead M. Jordan, Elgin, AZ (US); William R. Owens, Tucson, AZ (US); John Warren Beck, Tucson, AZ (US)

(73) Assignees: Raytheon Company, Waltham, MA (US); The Arizona Board of Regents on Behalf of the University of Arizona, Tucson, AZ (US)

( * ) Notice: Subject to any disclaimer, the term of this patent is extended or adjusted under 35 U.S.C. 154(b) by 189 days.

(21) Appl. No.: 12/949,670

(22) Filed: Nov. 18, 2010

(65) Prior Publication Data

US 2012/0128574 A1 May 24, 2012

(51) Int. Cl.
*D01F 9/12* (2006.01)
*C01B 31/04* (2006.01)
*B82Y 30/00* (2006.01)
*B82Y 40/00* (2006.01)

(52) U.S. Cl. .................. 423/447.8; 423/447.1; 423/448; 977/734; 977/742; 977/842

(58) Field of Classification Search ............... 423/447.1, 423/447.2, 447.3, 447.8, 448, 445 B; 977/742–754, 977/842–848; 428/367
See application file for complete search history.

(56) References Cited

U.S. PATENT DOCUMENTS 5,953,679 A 9/1999 Morris

OTHER PUBLICATIONS

Pourmortazavi, et al., Application of Supercritical Carbon Dioxide in Energetic Materials Processes: A Review, Ind. Eng. Chem. Res. 2005; 44: 6523-6533.*

Teipel et al., "Characterization of the Phase Equilibrium of the System Trinitrotoluene/Carbon Dioxide," Propellants, Explosives, Pyrotechnics 23, pp. 82-85 (1998).
Niehaus et al., "Suitability of Modified Supercritical Carbon Dioxide as Solvent for Polar Substances," Propellants, Explosives, Pyrotechnics 22, pp. 176-179 (1997).
Lou et al., "Synthesis of carbon nanotubes by reduction of carbon dioxide with metallic lithium," Carbon 41 (2003) pp. 3063-3074.
Shakhashiri, "Chemical of the Week—Carbon Dioxide, CO2," General Chemistry, www.scifun.org, Feb. 6, 2008.
Pourmortazavi et al.,"Application of Supercritical Carbon Dioxide in Energetic Materials Processes: A Review," 2005 American Chemical Society, Ind. Eng. Chem. Res. 2005, 44, pp. 6523-6533.
Lou et al, "Formation of variously shaped carbon nanotubes in carbon dioxide—alkali metal (Li, Na) system," Letters to the Editor / Carbon 43 (2005) pp. 1084-1114.

* cited by examiner

*Primary Examiner* — Daniel C. McCracken
(74) *Attorney, Agent, or Firm* — Eric A. Gifford

(57) ABSTRACT

Carbon nanostructures are synthesized from carbon-excess explosives having a negative oxygen balance. A supercritical fluid provides an environment that safely dissolves and decomposes the explosive molecules into its reactant products including activated C or CO and provides the temperature and pressure for the required collision rate of activated C atoms and CO molecules to form carbon nanostructures such as graphene, fullerenes and nanotubes. The nanostructures may be synthesized without a metal reactant at relatively low temperatures in the supercritical fluid to provide a cost-effective path to bulk fabrication. These nanostructures may be synthesized "metal free". As the supercritical fluid provides an inert buffer that does not react with the explosive, the fluid is preserved. Once the nanostructures are removed, the other reaction products may be removed and the fluid recycled.

21 Claims, 11 Drawing Sheets

| EXPLOSIVE | MOLECULAR WEIGHT | $C_aH_bN_cO_d$ | OXYGEN BALANCE |
|---|---|---|---|
| AMMONIUM NITRATE | 80.0 | $C_0H_4N_2O_3$ | +20% |
| HMX | 296.2 | $C_4H_8N_8O_8$ | -22% |
| NG | 227.1 | $C_3H_5N_3O_9$ | +3.5% |
| NM | 61.0 | $C_1H_3N_1O_2$ | -39% |
| PETN | 316.1 | $C_5H_8N_4O_{12}$ | -10% |
| PICRIC ACID | 229.1 | $C_6H_3N_3O_7$ | -45% |
| RDX | 222.1 | $C_3H_6N_6O_6$ | -22% |
| TATB | 258.1 | $C_6H_6N_6O_6$ | -56% |
| TETRYL | 287.1 | $C_7H_5N_5O_8$ | -47% |
| TNT | 227.1 | $C_7H_5N_3O_6$ | -74% |

FIG. 2

| EXPLOSIVE SUBSTANCE | REACTION FOR DECOMPOSITION PRODUCTS |
|---|---|
| PICRIC ACID | $C_6H_3N_3O_7 \rightarrow 5\tfrac{1}{2}CO + \tfrac{1}{2}C + 1\tfrac{1}{2}H_2O + 1\tfrac{1}{2}N_2$ |
| TETRYL | $C_7H_5N_5O_8 \rightarrow 5\tfrac{1}{2}CO + 1\tfrac{1}{2}C + 2\tfrac{1}{2}H_2O + 2\tfrac{1}{2}N_2$ |
| TATB | $C_6H_6N_6O_6 \rightarrow 3CO + 3C + 3H_2O + 3N_2$ |
| HNS | $C_{14}H_6N_6O_{12} \rightarrow 9CO + 5C + 3H_2O + 3N_2$ |
| TNT | $C_7H_5N_3O_6 \rightarrow 3\tfrac{1}{2}CO + 3\tfrac{1}{2}C + 2\tfrac{1}{2}H_2O + 1\tfrac{1}{2}N_2$ |

FIG. 3

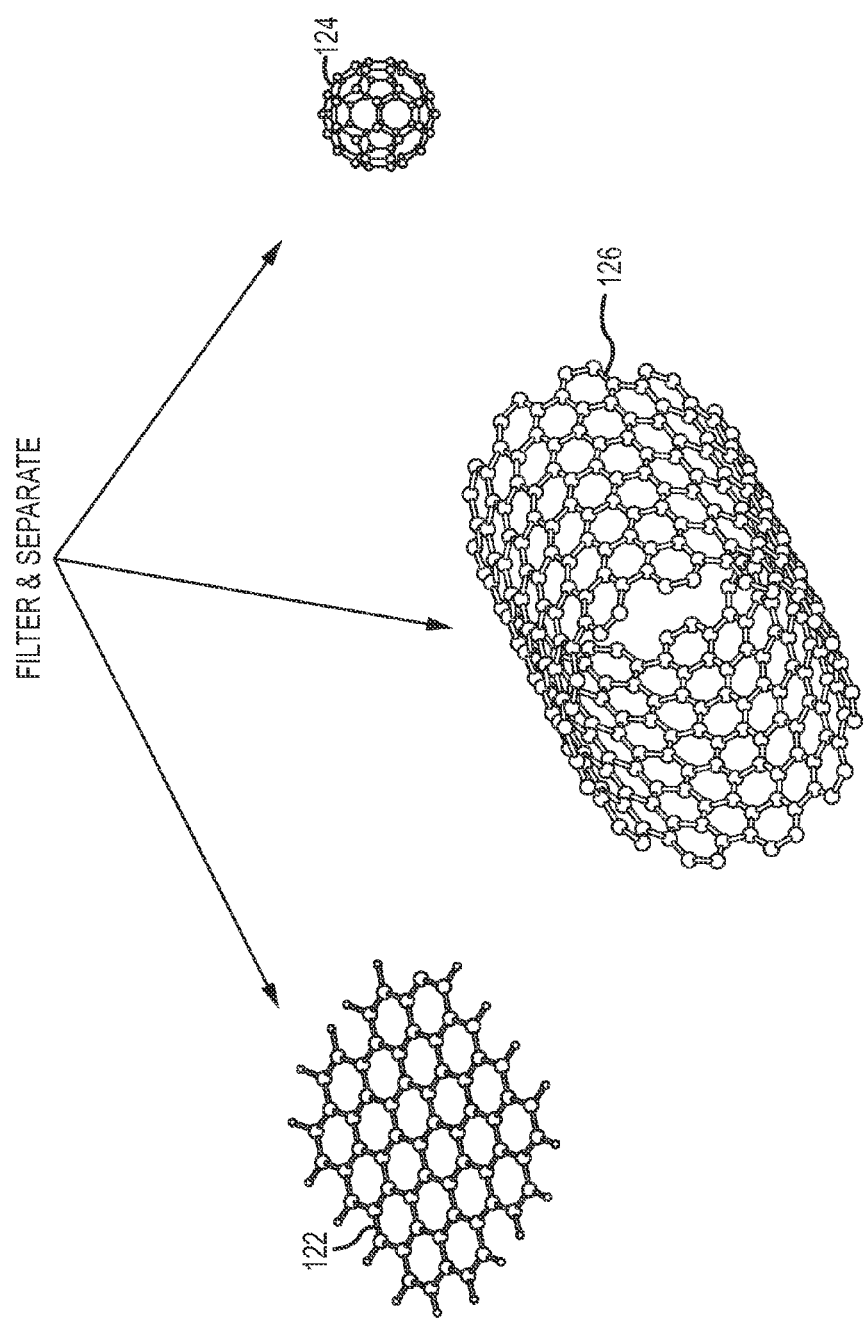

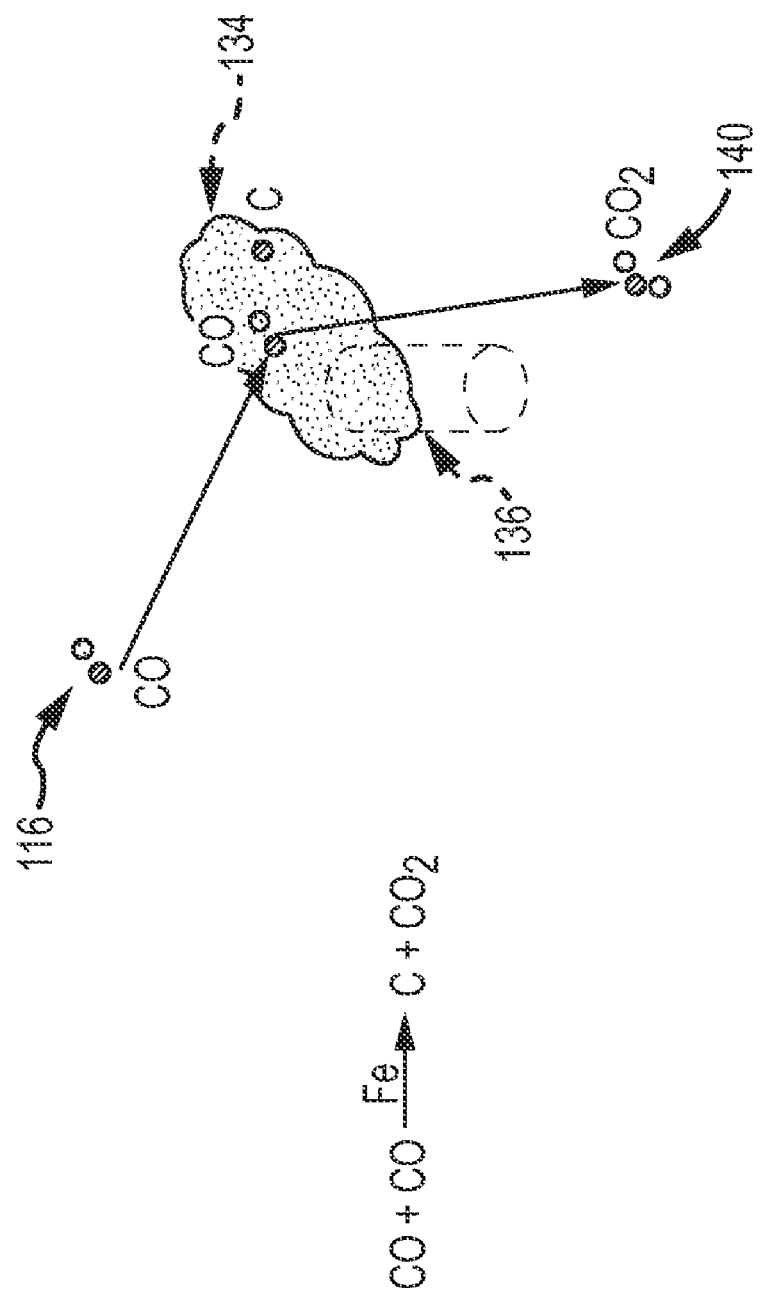

CARBON NANOSTRUCTURE SYNTHESIS FROM CARBON-EXCESS EXPLOSIVES IN SUPERCRITICAL FLUID

BACKGROUND OF THE INVENTION

1. Field of the Invention

This invention relates to the synthesis of carbon nanostructures such as graphene, fullerenes and nano-tubes, and more particular to the synthesis of such nanostructures from carbon-excess explosives in supercritical fluid.

2. Description of the Related Art

Graphene is a one-atom-thick planar sheet of $sp^2$-bonded carbon atoms that are densely packed in a honeycomb, hexagonal crystal lattice. Graphene is a basic building block for graphitic materials of all other dimensionalities. Graphene can be wrapped up into 0 D fullerenes, rolled into 1 D nano-tubes or stacked into 3 D graphite. Techniques for epitaxy deposition of graphene include but are not limited to Molecular Beam Epitaxy (MBE), Chemical Vapor Deposition (CVD) and plasma assisted CVD.

Graphene has rather remarkable properties. Graphene is stable, chemically inert, and crystalline under ambient conditions. It is a semimetal in that its conduction and valence bands just meet at discrete points in the Brillouin zone. An electron in graphene has an effective mass of zero and behaves more like a photon than a conventional massive particle. Finally graphene can carry huge current densities—about $10^8$ A/cm$^2$, roughly two orders of magnitude greater than copper. Graphene is a candidate for replacing silicon as a basis for faster, more powerful electronics. Graphene nanoribbons (GNRs) are essentially single layers of graphene that are cut in a particular pattern to give it certain electrical properties.

A fullerene is a spherical shaped carbon molecule. A common method used to produce fullerenes is to send a large current between two nearby graphite electrodes in an inert atmosphere. The resulting carbon plasma arc between the electrodes cools into sooty residue from which many fullerenes can be isolated.

A carbon nanotubes (CNT) is a hollow cylindrical shaped carbon molecule. The properties of single-walled nanotubes (SWNTs) are determined by the graphene structure in which the carbon atoms are arranged to form the cylinder. Multi-walled nanotubes (MWNTs) are made of concentric cylinders around a common central hollow. CNTs have stimulated a great deal of interest in the microelectronic and other industries because of their unique properties including tensile strengths above 35 GPa, elastic modulus reaching 1 TPa, higher thermal conductivity than diamond, ability to carry 1000× the current of copper, densities below 1.3 g/cm$^3$ and high chemical, thermal and radiation stability. CNTs have great promise for devices such as field effect transistors, field emission displays, single electron transistors in the microelectronic industry, and uses in other industries. CNTs are commonly grown using several techniques such as arc discharge, laser ablation and chemical vapour deposition (CVD). Commercialization of CNTs will depend in large part on the ability to grow and network CNTs on a large cost-effective scale without compromising these properties.

Another proposed approach is to change waste carbon dioxide into CNTs. In this approach supercritical carbon dioxide (scCO$_2$) is used as the carbon source and alkali metals (Li or Na) as the reductants to synthesize CNTs at reaction temperatures of 600-750 degrees C. The Lithium reacts with the supercritical CO$_2$ to produce Lithium-Carbonate and activated carbon. The activated carbon reassembles or self-organizes into CNTs. In this processes the CO$_2$ is at least partially consumed by the synthesis of the CNTs. This approach is offered as a technique for synthesizing CNTs that can be scaled up for industrial applications. However, the use of alkali metals and the high reaction temperatures increases the cost of the process. Furthermore, the presence of a metal reactant will leave metal contaminants in the extracted CNTs, which is undesirable for certain applications such as nanoelectronic devices. See Zhengsong Lou et al. "Synthesis of carbon nanotubes by reduction of carbon dioxide with metal lithium" Letters to the Editor, Carbon 41 (2003) 3063-3074 and Zhengsong Lou et al. "Formation of variously shaped carbon nanotubes in carbon dioxide-alkali metal (Li, Na) system" Letters to the Editor, Carbon 43 (2005) 1084-1114, which are hereby incorporated by reference.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a cost-effective technique for synthesizing carbon nanostructures in quantities for industrial applications, a technique that may produce "metal free" nanostructures.

In an embodiment, a method of synthesizing carbon nanostructures comprises providing an explosive material of carbon-based molecules. Useful explosives such as TNT, picric acid, tetryl, TATB, PETN, RDX, HMX and NM will exhibit a negative oxygen balance and have activated C or CO as reactant products. The explosive material is dissolved in a supercritical fluid in an oxygen-free environment. One such fluid is supercritical CO$_2$. The supercritical fluid acts as an inert buffer to separate the carbon-based explosive molecules. The supercritical fluid is heated to a temperature exceeding the decomposition temperature of the explosive to decompose the explosive molecules into reaction products comprising activated C or CO. Sufficient dilution of the explosive in the fluid reduces inter-molecular interactions between explosive molecules. Self-activation of the explosive molecules will still occur but will not trigger spontaneous reaction in neighboring explosive molecules. The activated C with or without a catalyst or CO with a catalyst will reassemble in the supercritical fluid to form carbon nanostructures. Reassembly of the activated C without a catalyst produces "metal-free" nanostructures. Some portion of the activated C and CO will return to its stable state forming amorphous carbon. The fluid is filtered to remove the carbon nanostructures. The nanostructures may include one or more of graphene, fullerenes or CNTs. The temperature of the fluid may affect the relative mixture of nanostructures. Once the nanostructures have been removed, the other reactants may be removed and the supercritical fluid recycled.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 2 is a table of explosives and their oxygen balance;

FIG. 3 is a table of explosive materials having a negative oxygen balance and their reaction for decomposition products;

FIG. 10 is a diagram illustrating the removal and separation of the synthesized nanostructures into graphene, fullerenes and nanotubes; and FIG. 11 is a diagram of the reassembly of activated carbon monoxide into CNTs with a catalyst.

DETAILED DESCRIPTION OF THE INVENTION

Figure 1:
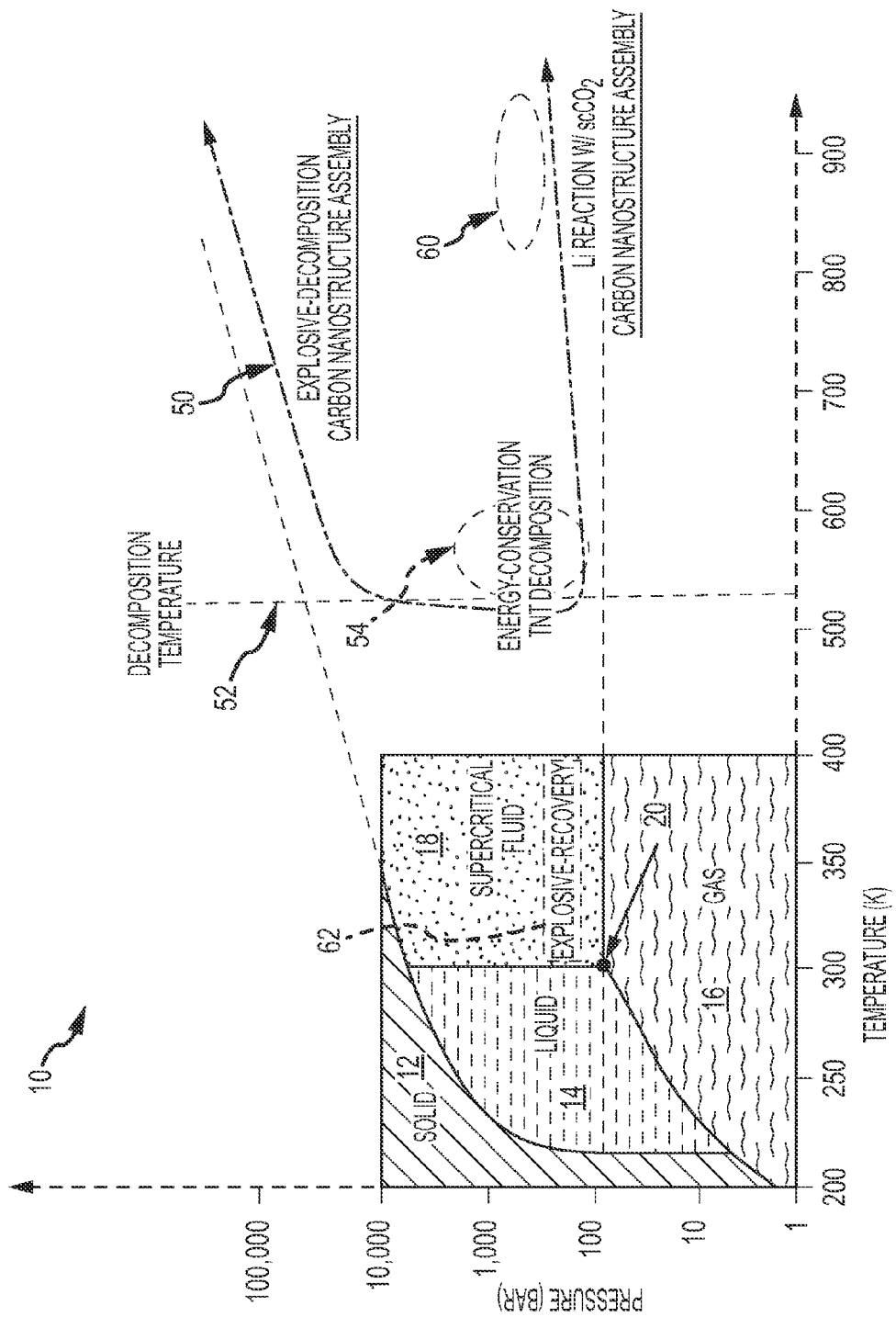
FIG. 1 is a phase diagram of CO$_2$ illustrating the region of interest within the supercritical fluid for decomposing carbon-excess explosives and reassembling the activated carbon into nanostructures.

The ability to safely dissolve bulk explosives in $scCO_2$ has been demonstrated. The $scCO_2$ serves as an inert buffer to separate the individual explosives molecules. Michael Niehaus et al. "Suitability of modified supercritical carbon dioxide as solvent for polar substances" Propellants, Explosives, Pyrotechnics 22, 176-179 (1997), which is hereby incorporated by reference, demonstrates the use of $scCO_2$ as a solvent for explosives just as PETN and RDX. Niehaus studies the introduction of co-solvents (modifiers) to change the solvent capacity or critical point. Niehaus performed his experiments at 300 bar, 50 degrees C. U.S. Pat. No. 5,953,679 entitled "Method for recover and separation of trinotrotolune by supercritical fluid extraction" issued Sep. 14, 1999), which is hereby incorporated by reference, teaches contacting explosive with scCO2 at a temperature above the melting point of TNT and recovering the TNT. The critical temperature is 31.04 C. Morris operates at temperatures of about 65 to about 85 degrees C. to separate the TNT from its binder and extract the TNT. Seied Mahdi Pourmortazavi et al. "Application of supercritical carbon dioxide in energetic materials processes: A review" Ind. Eng. Chem. Res. 2005, 44, 6523-6533), which is hereby incorporated by reference, discusses the production of very fine particles of energetic materials such as RDX, TNT and HMX using a supercritical carbon dioxide. The various reviewed processes dissolve the explosives in the supercritical fluid within a temperature range of approximately 35 to 80 degrees C.

In each of these examples, bulk explosive is contacted with $scCO_2$ at temperatures where the explosives dissolves into the supercritical fluid but the molecular structure of the explosive is preserved e.g. 30 to 85 degrees C. In the case of extracting explosive from warheads, the explosive is separated from the binder and then allowed to recombine into a bulk explosive. In the case of forming fine explosive particles, the explosive molecules recombine into nano- or micro-sized particles of explosive.

We take the process a couple steps further and in a different direction to extract carbon nanostructures from carbon-excess explosives that exhibit a negative oxygen balance. Explosives having a sufficient negative oxygen balance provide the source of carbon. A supercritical fluid such as supercritical carbon-dioxide ($scCO_2$) provides an environment that safely dissolves and decomposes the explosive molecules into its reactant products including activated C or CO and provides the temperature and pressure for the required collision rate of activated C atoms and CO molecules to form carbon nanostructures such as graphene, fullerenes and nanotubes. We operate in a region of the supercritical fluid at temperatures above the decomposition temperature of the explosive. For TNT, the decomposition temperature is approximately 250 degrees C. This process may be performed without a metal reactant at relatively low temperatures in the supercritical region to provide a cost-effective path to bulk fabrication of nanostructures. Furthermore, an instantiation of the process can produce "metal-free" nanostructures. As the supercritical fluid provides an inert buffer that does not react with the explosive, the fluid is preserved. Once the nanostructures are removed, the other reactant products may be removed and the supercritical fluid recycled. As a byproduct of this product, the explosive material itself is reduced and decommissioned.

Referring now to FIG. 1, a pressure-temperature phase diagram 10 illustrates the solid 12, liquid 14, gas 16 and supercritical fluid 18 for carbon-dioxide ($CO_2$). Boiling separates the gas and liquid phases and ends in a critical point 20 where the liquid and gases phases disappear to become a single supercritical fluid phase. The critical point for $CO_2$ is 304.1 degrees K at 7.38 MPA (73.07 bar). A supercritical fluid can dissolve materials like a liquid. In addition, close to the critical point, small changes in pressure or temperature result in large changes in density. There is no surface tension in a supercritical fluid, as there is no liquid/gas phase boundary. By changing the pressure and temperature of the fluid, the properties can be "tuned" to be more liquid- or more gas-like. One of the most important properties is the solubility of material in the fluid. Solubility in a supercritical fluid tends to increase with density of the fluid (at constant temperature). Since density increases with pressure, solubility tends to increase with pressure. Without loss of generality, the processes for synthesizing nanostructures from carbon-excess explosives in a supercritical fluid will be described for supercritical $CO_2$ with the understanding that other supercritical fluids may be used as well.

An explosive material, also called an explosive, is a substance that contains a great amount of stored energy that can produce an explosion, a sudden expansion of the material after initiation when heated or shocked, usually accompanied by the production of light, heat, sound, and pressure. The explosive carries an oxidizer and a reducer in a metastable state. The explosive molecules share electrons among the reactant products. These shared electrons exist at higher orbits and energy levels, hence the metastable nature of the explosive. When initiated, the explosive molecules decompose into their reactant products in stable states at much lower energy levels, hence the rapid release of energy.

An explosion is a type of spontaneous chemical reaction (once initiated) that is driven by both a highly negative enthalpy change (much heat is released) and a highly positive entropy change (large quantities of gases are released) in going from reactants to reaction products, thereby constituting a very thermodynamically favorable process in addition to one that is kinetically very fast. Thus, explosives are substances that contain a large amount of energy stored in chemical bonds. The energetic stability of the gaseous products and, hence, their generation comes from the formation of strongly bonded species like carbon monoxide, carbon dioxide, and (di)nitrogen, which contain strong double and triple bonds having bond strengths of nearly 1,000 kJ/mole. Consequently, most commercial explosives are organic compounds containing —NO₂, —ONO₂ and —NHNO₂ groups that when detonated release gases like the aforementioned ones (e.g. nitroglycerin, TNT, HMX, PETN, nitrocellulose).

Oxygen balance (OB, or OB %) is an expression that is used to indicate the degree to which an explosive can be oxidized. If an explosive molecule contains just enough oxygen to form carbon dioxide from carbon, water from hydrogen molecules, all of its sulfur dioxide from sulfur, and all metal oxides from metals with no excess, the molecule is said to have a zero oxygen balance. The molecule is said to have a positive oxygen balance if it contains more oxygen than is needed and a negative oxygen balance if it contains less oxygen than is needed; the combustion will then be incomplete, and large amount of toxic gases like carbon monoxide will be present.

FIG. 2 is a table 30 of some common CHNO (carbon-hydrogen-nitrogen-oxygen) explosives and their respective oxygen balances. Explosives such as HMX, NM, PETN, Picric Acid, RDX, TATB, Tetryl and TNT exhibit significant negative oxygen balances. The oxygen balance is calculated from the empirical formula of a compound in percentage of oxygen required for complete conversion of carbon to carbon dioxide, hydrogen to water, and metal to metal oxide.

Referring now to FIG. 3, a table 40 illustrates the reaction for decomposition products in an oxygen-free environment for a number of common explosives that exhibit negative oxygen balances. These particular explosives decompose into CO, C, H₂O and N₂ reaction products. Other explosives such as PET, RDX and HMX decompose into CO, H₂O and N₂ but do not produce C. Under normal conditions, upon initiation via heat and/or pressure, a spontaneous reaction is triggered throughout the explosive material causing large amounts of stored energy to be released producing an uncontrolled explosion and the reaction products.

Referring back to FIG. 1, we dissolve a suitable explosive material having a negative oxygen balance in a solvent comprising a supercritical fluid such as $scCO_2$ in an oxygen-free environment. The $CO_2$ acts as an inert buffer to separate the carbon-based explosive molecules. Sufficient dilution of the explosive in the $scCO_2$ reduces inter-molecular interactions between explosive molecules so that when the explosive is activated the explosive molecules will still self-activate and decompose but will not trigger spontaneous reacting in neighboring explosive molecules (e.g. the explosive will not explode). The supercritical fluid is heated to a temperature exceeding the decomposition temperature of the explosive to self-activate and decompose the explosive molecules into reaction products comprising activated C or CO. When the molecules are decomposed at high temperature they transition through an activated metastable state in which the carbon and CO atoms electrons are still in the higher energy orbits/states. In this state the carbons atoms are very reactive and will reassemble with other activated carbon atoms for form carbon nanostructures. At higher temp, the atoms are more reactive. At higher pressures the atoms are closer together and more likely to react as well. A general region of interest 50 spans any temperature greater than the decomposition temperature 52 for a particular explosive within the supercritical fluid region 18.

The optimal conditions that define a particular region of interest 54 for producing nanostructures will depend on a number of factors including but not limited to the particular explosive used as the carbon source, the desired type and mixture of nanostructures, whether modifiers have been added to the supercritical $CO_2$ to change the solvent properties and critical temperature and energy conservation. The resulting nanostructures are not soluble and relatively large compared to the $CO_2$ and other reactant products so they can be filtered and separated. For TNT dissolved in supercritical $CO_2$ the region of interest 50 may span a temperature range from approximately 250 degrees C. to 350 degrees C. and a pressure range from approximately 200 bar to 2,000 bar. The minimal temperature must at least exceed the critical point for the fluid and the decomposition temperature for the explosive. The maximum temperature is set only by power consumption considerations, higher temperatures may be used and successfully produce nanostructures but are simply not required. Note, metals such as Lithium (Li) or Sodium (NA) that would react with the $scCO_2$ (making the $scCO_2$ a source of carbon) are not introduced to the fluid. Thus, even if the process were performed at these elevated temperatures, the chemistry of the decomposition of the explosive molecules and reassembly of the nanostructures would be the same. The $scCO_2$ functions only as inert buffer and does not react, hence is preserved throughout the process. In this particular example, region of interest 54 is constrained to conserve energy for the process (energy used to heat the fluid is balanced by the energy produced by decomposing the explosive) using TNT as the explosive.

For purposes of comparison the regions of interest 60 and 62 for the known processes of reacting Lithium with $scCO_2$ at high temperatures (where the $scCO_2$ is the source of the carbon) to produce carbon nanotubes and of dissolving explosives in $scCO_2$ at low temperatures to either recover the pure explosive or to form nano/micro explosive particles are shown in FIG. 1. The published experiments for reacting Lithium with $scCO_2$ report temperatures for region of interest 60 of 550 degrees C. and above. Very high temperatures are required to get the Lithium to react with the $CO_2$ to produce the activated C atoms. By contrast, the published experiments for using $scCO_2$ to dissolve and separate explosive molecules report temperatures for region of interest 62 of between 30 to 80 degrees C.

Figure 4:
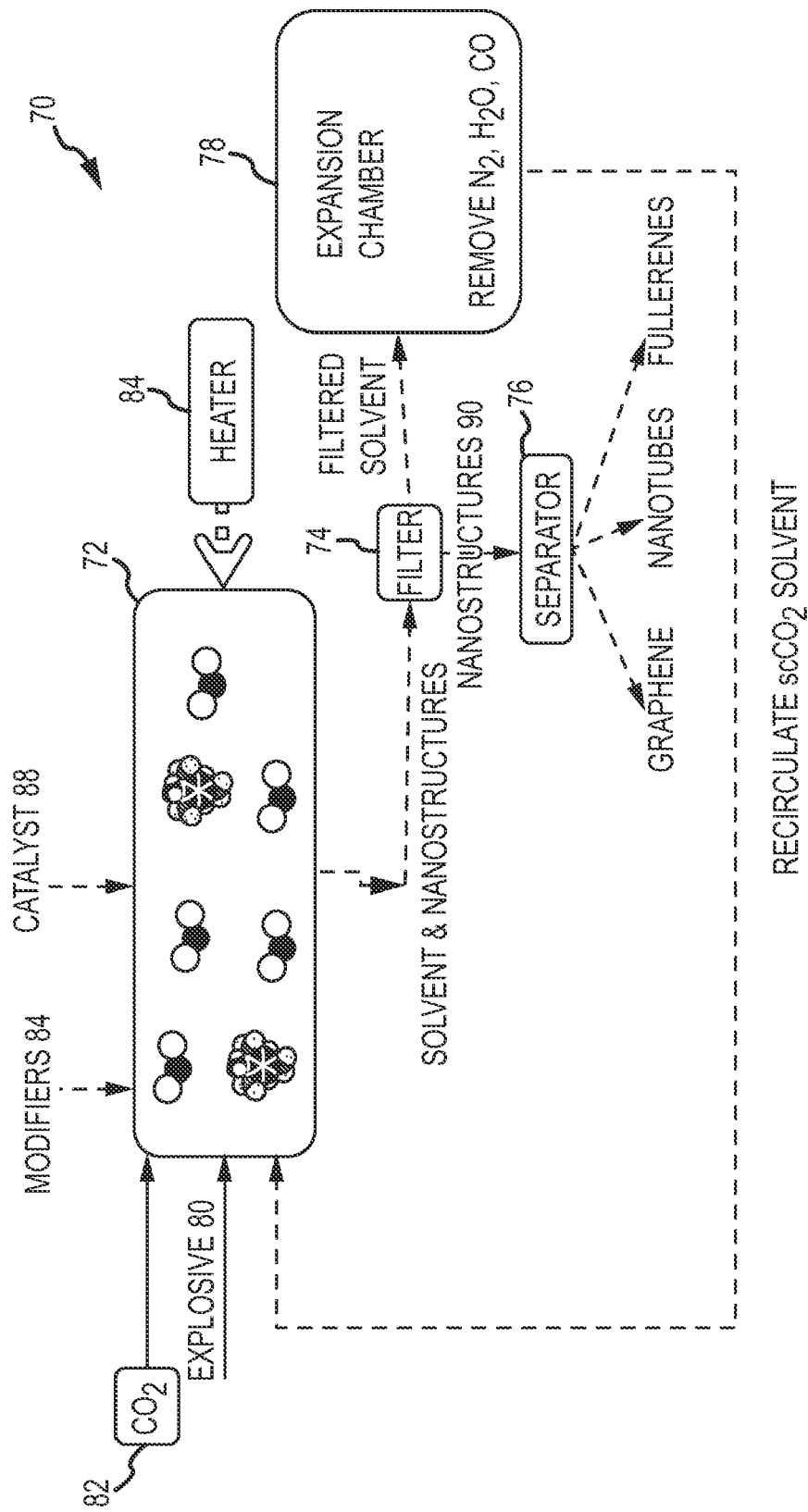
FIG. 4 is a diagram of an embodiment of an apparatus for synthesizing nanostructures from carbon-excess explosives in supercritical $CO_2$ ($scCO_2$)
Figure 5:
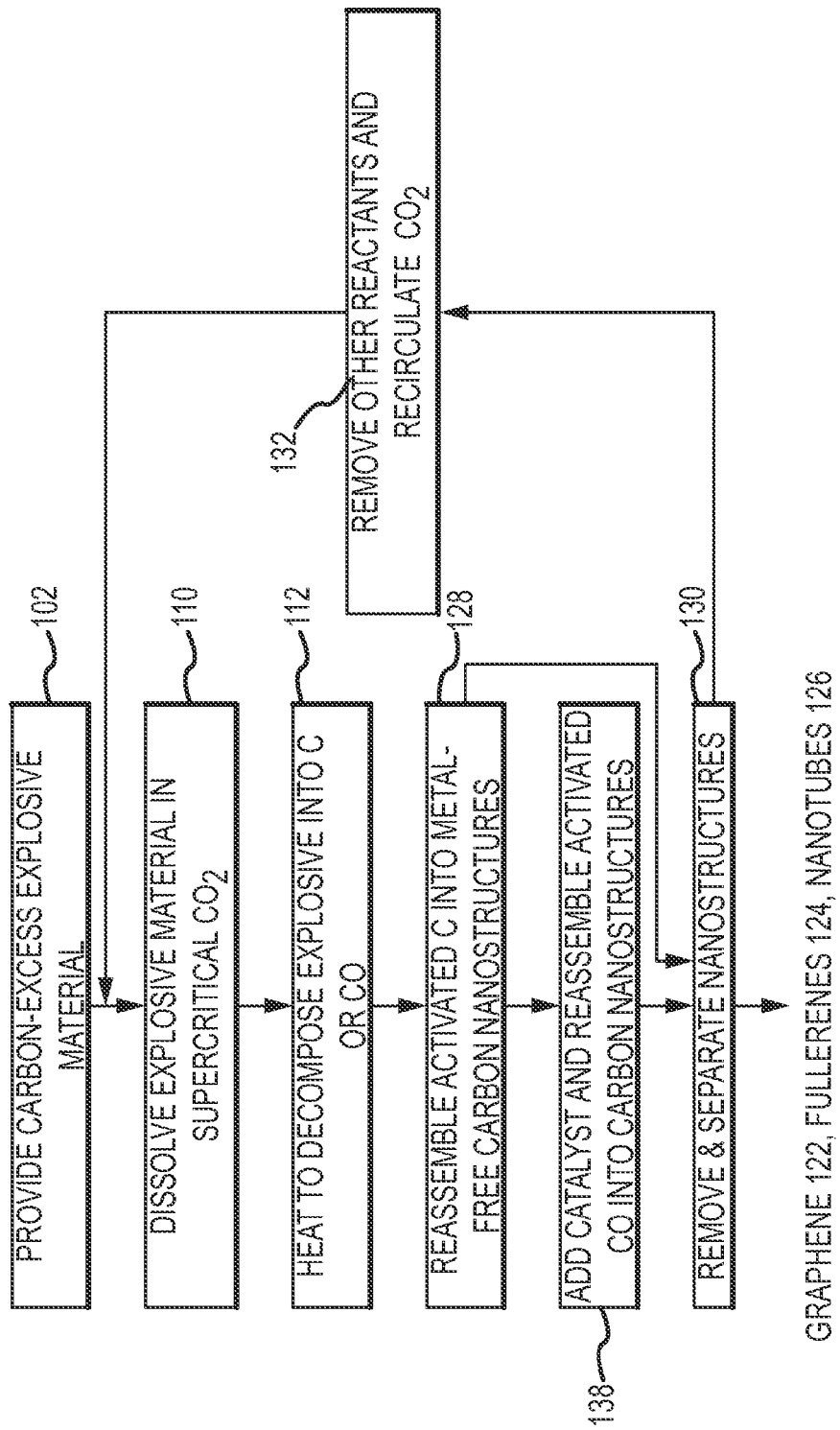
FIG. 5 is a flow diagram of an embodiment for synthesizing nanostructures from carbon-excess explosives in supercritical $CO_2$ ($scCO_2$)
Figure 6:
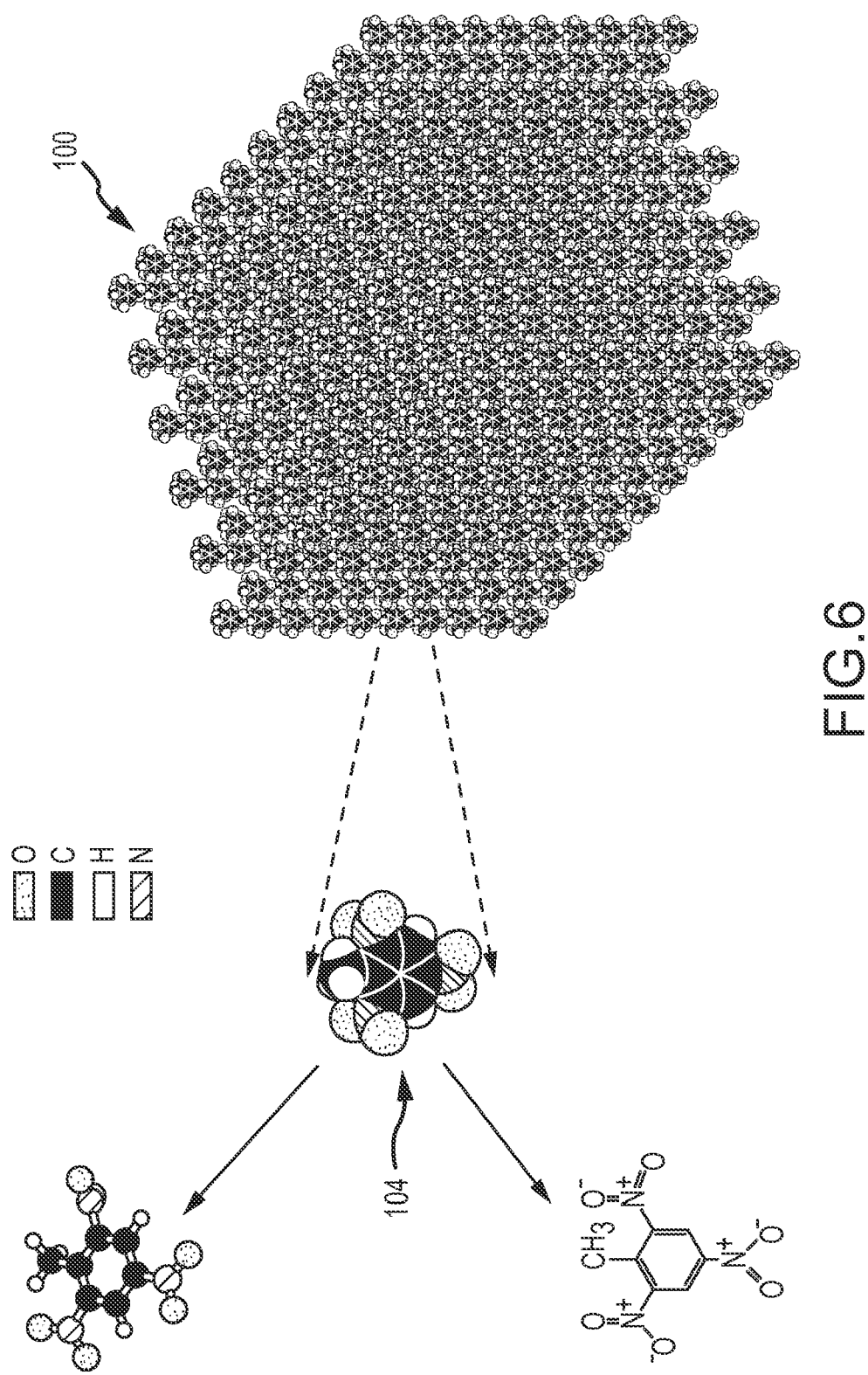
FIG. 6 is a diagram of explosive material comprising TNT.
Figure 7:
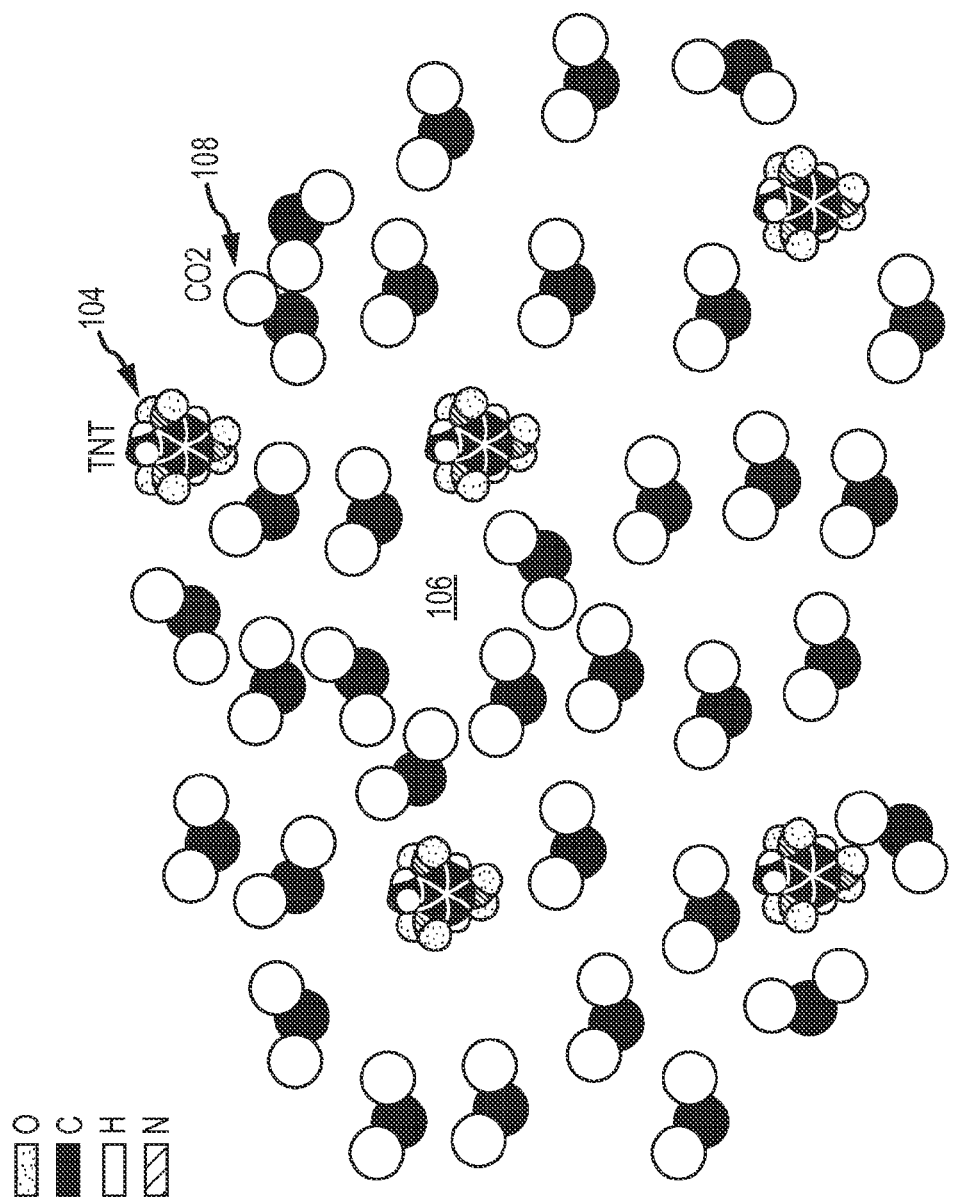
FIG. 7 is a diagram of the TNT molecules dissolved in the sc $CO_2$ that acts as an inert buffer.
Figure 8:
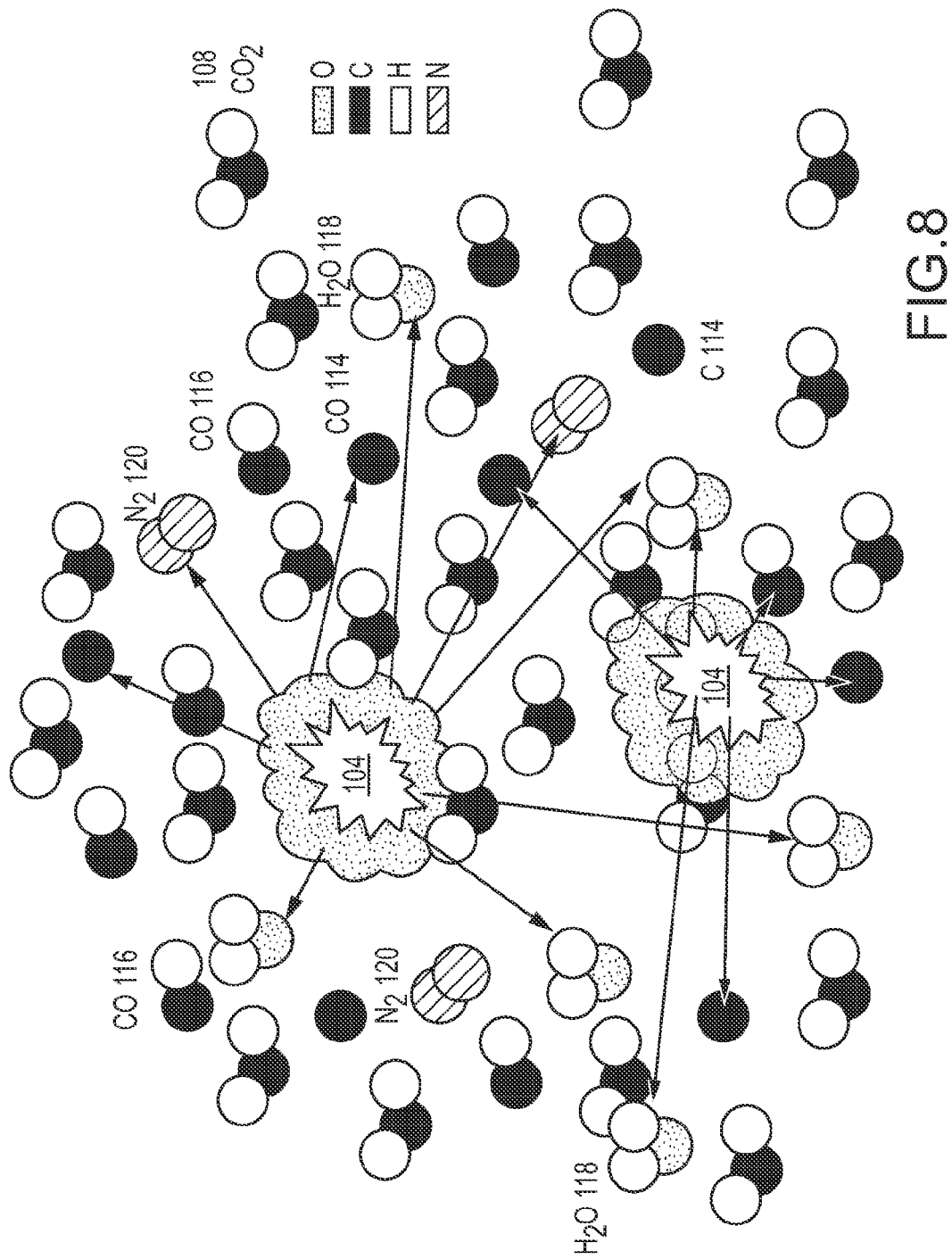
FIG. 8 is a diagram of the TNT molecules decomposed into their constituent reactants including activated C and CO.
Figure 9:
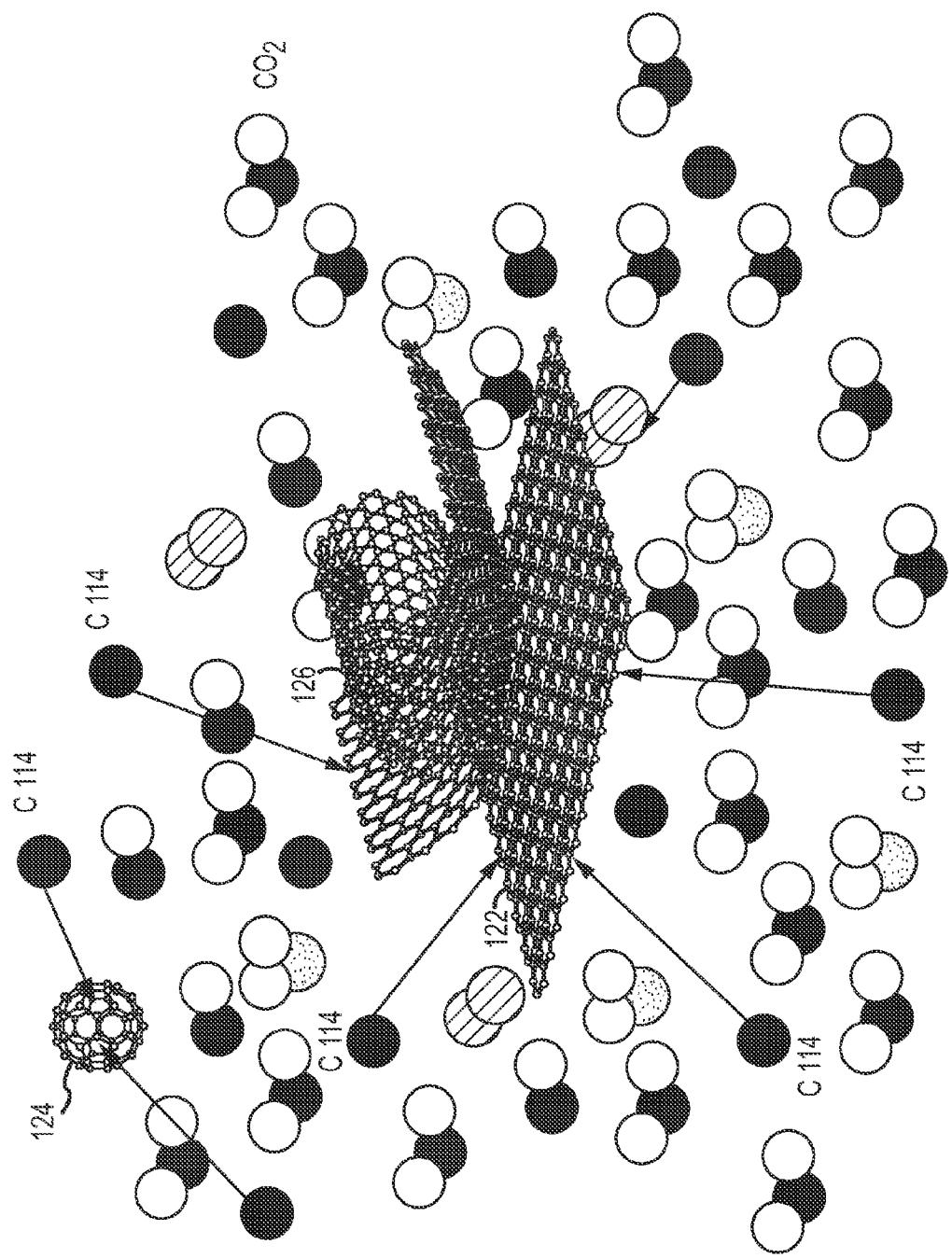
FIG. 9 is a diagram of the reassembly of activated carbon into carbon-free CNTs.

Referring now to FIG. 4, an embodiment of a system 70 for synthesizing carbon nanostructures from carbon-excess explosives comprises a reactor vessel 72, a filter 74 for removing the nanostructures from the $scCO_2$, a separator 76 (optional) such as a centrifuge for separating the different types of nanostructures and an expansion chamber 78 (optional) for removing the remaining reaction products and re-circulating the $scCO_2$. An explosive 80, suitably in powder form, is placed in the reactor vessel. A source 82 of $CO_2$, in liquid or gas form, is coupled to the reactor vessel to provide a solvent. Modifiers 84 such as water or ammonia may be introduced into the vessel to alter the solvent properties or critical point. A heater 86 controls the vessel temperature. Vessel pressure may be controlled via the amount of $CO_2$ introduced, the temperature or possibly using pistons to pressurize the vessel. If needed, a catalyst 88 may be introduced into the fluid. This may be accomplished through a series of vacuum gates coupled to the vessel.

The reactor vessel is heated and pressurized to produce a supercritical $CO_2$ environment in which explosive 80 dissolves, decomposes into active C or CO and reassembled to form carbon nanostructures 90. The supercritical $CO_2$ and nanostructures are flushed from the reactor vessel and pass through filter 74. The filter removes the nanostructures, which are not soluble, from the fluid. The nanostructures, which may include a varied composition of graphene, fullerenes and nanotubes, may be passed through a separator 76 (e.g. a centrifuge or chromatography process) to separate the different types of nanostructures. The filtered fluid may be passed to expansion chamber 78 that implements a distillation process that boils off the $CO_2$ fluid and different reaction products. The different gases evaporate at different temperatures. The chamber is configured to trap the $CO_2$ as it evaporates and recirculate the $CO_2$ back to the reactor vessel.

Referring now to FIGS. 5-11, an embodiment of the process for synthesizing carbon nanostructures from is illustrated. A carbon-excess explosive material such as TNT 100 is provided (step 102). TNT is a CHNO explosive having a molecular representation 104 of $C_7H_5N_3O_6$ and exhibits a negative oxygen balance of −74%. TNT 100 is dissolved into a solvent comprising supercritical $CO_2$ 106 made up of $CO_2$ molecules 108 (step 110). This occurs at a temperature above the critical point for the $CO_2$ based fluid. The mixture may, for example, comprise approximately 95% by weight $CO_2$ and 5% by weight TNT to provide sufficient dilution to buffer the TNT molecules. The fluid is heated to a temperature above the decomposition temperature of the explosive (step 112) to activate the TNT molecules 104 to decompose into the reaction products of C 114, CO 116, $H_2O$ 118 and $N_2$ 120 (e.g. $7CO+7C+5H_2O+3N_2$) in a background of $scCO_2$ of $CO_2$ molecules 108. For TNT, in an embodiment the fluid pressure and temperature suitably lie in a range between 100 bar, 250 degrees C. and 3,000 bar, 350 degrees C. The steps of dissolving and decomposing the explosive in the $scCO_2$ may occur at the same or different temperature. The explosive material may be introduced into the $scCO_2$ at a temperature sufficient only to dissolve the explosive material. The fluid may then be heated to decompose the explosive molecules. Alternately, the explosive material may be introduced into the $scCO_2$ at the higher temperature to both dissolve and decompose the explosive.

The reaction products of C 114, CO 116, $H_2O$ 118 and $N_2$ 120 are at least temporarily in an activated state. Their electrons occupy a higher orbit, hence higher energy state. These electrons will naturally return to their lower orbit, lower energy stable states. However, the temperature and pressure conditions of the supercritical $CO_2$ that dissolve and decompose the TNT molecules also provide an environment that supports the required collision rate of activated C atoms to reassemble carbon nanostructures such as graphene 122, fullerenes 124 and nanotubes 126 (step 128). Steps 112 and 128 of decomposition and reassembly may happen approximately simultaneously and may overlap as the reassembly process starts while explosive molecules continue to decompose.

The activated C atoms will self-organize into the various nanostructures. The carbon may assemble into graphene 122, which may then roll into nanotubes 126 or fullerenes 124. Alternately, the carbon may assembly directly into the fullerenes 124 or nanotubes 126. The composition of the reassembled nanotubes may depend on such factors as the explosive, the fluid (e.g. any modifiers introduced), the temperature and pressure and whether a catalyst was introduced or not. In particular the temperature may be set to affect the composition of nanostructures (e.g. different temperatures may produce a higher concentration of nanotubes). A distinct advantage of this process is that the nanostructures are "metal-free". Because the explosive provides the source of carbon, no metal (e.g. Li) is required to react with the $scCO_2$ and thus no metals are introduced to the process. Carbon nanostructures that are free of metal contaminants may be very useful in certain applications such as electronic devices.

At this point, the fluid may be filtered to remove the carbon nanostructures and the nanostructures separated (step 130). Because the $scCO_2$ functions only as an inert buffer and does not react with the explosive or any other element that may be introduced the $CO_2$ is preserved. The filtered fluid may be processed further to remove the other reaction products such as CO, $N_2$ or $H_2O$ and recirculated (step 132). The fluid may or may not remain in its supercritical phase during the filtering and recirculation processes.

Alternately, a catalyst 134 such as Fe may be added to the fluid to reassemble the activated CO molecules 116 into nanostructures 136 (step 138). The Fe catalyzes the reaction of a pair of CO molecules 116 to form C atoms that form the nanostructures and $CO_2$ molecules 140. The pressure and temperature conditions may be adjusted to optimize nanostructure synthesis in the presence of a catalyst while remaining in the supercritical fluid phase. The fluid may be filtered again to remove the carbon nanostructures and Fe catalyst (step 130). The Fe catalyst may be separated and removed from the nanostructures. As the Fe only acts as a catalyst if the Fe can all be removed than the nanostructures may be considered to be metal free. The process may be configured to extract carbon nanostructures from the activated C or CO in different ways. In addition to those described above, the catalyst could be introduced into the fluid early in the process to catalyze nanostructure growth for both the activated C and CO. An explosive may be used that only produces a CO reaction product (no activated C).

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of making carbon nanostructures, comprising:
providing an explosive material comprising carbon-based molecules, said explosive having a negative oxygen balance;
dissolving the explosive material in a supercritical fluid in an oxygen-free environment, said supercritical fluid acting as an inert buffer to separate the carbon-based explosive molecules;
heating the supercritical fluid to a temperature exceeding the decomposition temperature of the explosive to decompose the explosive molecules into reactants comprising activated C or CO;
reassembling the activated C with or without a catalyst or CO with a catalyst in the supercritical fluid to form carbon nanostructures; and
filtering the fluid to remove the carbon nanostructures.

2. The method of claim 1, wherein the weight percent of the supercritical fluid exceeds a threshold for the explosive at which the dissolved explosive is sufficiently dilute that activation of one explosive molecule does not trigger spontaneous explosive activation of neighboring explosive molecules.

3. The method of claim 1, wherein the supercritical fluid is heated to a temperature of at least 250 degrees C. at a pressure of at least 100 bar.

4. The method of claim 3, wherein the supercritical fluid is heated to temperature of at most 350 degrees C. at a pressure of at most 3,000 bar.

5. The method of claim 1, wherein the reassembled carbon nanostructures comprise at least one of graphene, fullerenes and nanotubes.

6. The method of claim 1, wherein the reassembled carbon nanostructures comprise at least two of graphene, fullerenes and nanotubes.

7. The method of claim 6, wherein the composition of the nanostructures is a function of temperature, said supercritical fluid is heated to a target temperature to affect the composition of the nanostructures.

8. The method of claim 1, further comprising:
removing all other reaction products from the fluid; and
recirculating the fluid to repeat the process of making carbon nanostructures.

9. The method of claim 1, wherein activated C is reassembled to form metal-free carbon nanostructures.

10. The method of claim 9, wherein only activated C is reassembled to form only metal-free carbon nanostructures.

11. The method of claim 9, wherein the explosive is selected from TNT, picric acid, tetryl, TATB, and HNS.

12. The method of claim 9, wherein after the activated C is reassembled to form metal-free carbon nanostructures and the fluid is filtered to remove those nanostructures, further comprising:
introducing a catalyst into the supercritical fluid; and
reassembling the activated CO with the catalyst to grow carbon nanostructures on the catalyst.

13. The method of claim 12, further comprising:
adjusting the temperature or pressure of the supercritical fluid for reassembling activated CO with the catalyst.

14. The method of claim 9, further comprising:
introducing a catalyst into the supercritical fluid; and
reassembling the activated C or activated CO with the catalyst to grow carbon nanostructures on the catalyst.

15. The method of claim 1, wherein the supercritical fluid comprises supercritical carbon dioxide ($scCO_2$) fluid.

16. A method of making carbon nanostructures, comprising:
providing an explosive material comprising carbon-based molecules, said explosive having a negative oxygen balance;
dissolving the explosive material in a metal-free supercritical carbon dioxide ($scCO_2$) fluid in an oxygen-free environment, said $CO_2$ acting as an inert buffer to separate the carbon-based explosive molecules;
heating the supercritical fluid to a temperature exceeding the decomposition temperature of the explosive to decompose the explosive molecules into reactants comprising activated C;
reassembling the activated C without a catalyst in the supercritical fluid to form metal-free carbon nanostructures; and
filtering the fluid to remove the carbon nanostructures.

17. The method of claim 16, wherein the supercritical fluid is heated to a temperature of at least 250 degrees C. at a pressure of at least 100 bar.

18. The method of claim 17, wherein the supercritical fluid is heated to temperature of at most 350 degrees C. at a pressure of at most 3,000 bar.

19. The method of claim 16, wherein the reassembled carbon nanostructures comprise at least two of graphene, fullerenes and nanotubes.

20. The method of claim 19, wherein the composition of the nanostructures is a function of temperature, said supercritical fluid is heated to a target temperature to affect the composition of the nanostructures.

21. The method of claim 16, further comprising:
removing all other reaction products from the fluid; and
recirculating the fluid to repeat the process of making metal-free carbon nanostructures.

* * * * *